US007458194B2

(12) United States Patent  
Maltais et al.

(10) Patent No.: US 7,458,194 B2
(45) Date of Patent: Dec. 2, 2008

(54) APPARATUS FOR PRODUCING A SELF-STANDING BAG FOR BALES OF COMPRESSED LOOSE MATERIAL AND A METHOD THEREOF

(75) Inventors: Patrice Maltais, Riviére-du-Loup (CA); Jean-François Albert, Riviére-du-Loup (CA)

(73) Assignee: Premier Tech Technologies Limitee (CA)

( * ) Notice: Subject to any disclaimer, the term of this patent is extended or adjusted under 35 U.S.C. 154(b) by 73 days.

(21) Appl. No.: 11/744,004

(22) Filed: May 3, 2007

(65) Prior Publication Data

US 2007/0251191 A1 Nov. 1, 2007

Related U.S. Application Data

(63) Continuation of application No. PCT/CA2005/001691, filed on Nov. 3, 2005.

(60) Provisional application No. 60/624,182, filed on Nov. 3, 2004.

(30) Foreign Application Priority Data

Nov. 3, 2004 (CA) .................................... 2486631

(51) Int. Cl.
*B65B 1/24* (2006.01)
*B65B 9/00* (2006.01)
(52) U.S. Cl. ............................. 53/436; 53/527; 53/459; 53/523
(58) Field of Classification Search .................. 53/436, 53/527, 459, 456, 575, 523
See application file for complete search history.

(56) References Cited

U.S. PATENT DOCUMENTS

| 3,289,387 | A | | 12/1966 | Stagmeier et al. ............. 53/512 |
| 4,121,399 | A | | 10/1978 | Verville ....................... 53/436 |
| 5,213,145 | A | * | 5/1993 | Huang et al. ................. 141/391 |
| 5,316,060 | A | * | 5/1994 | Hodgdon et al. ............ 141/390 |

(Continued)

FOREIGN PATENT DOCUMENTS

| CA | 1043310 | 11/1978 |
| EP | 1459995 | 9/2004 |

OTHER PUBLICATIONS

International Search Report, Jan. 12, 2006, 2 pages.

(Continued)

*Primary Examiner*—Rinaldi I. Rada
*Assistant Examiner*—John Paradiso
(74) *Attorney, Agent, or Firm*—St. Onge Steward Johnston & Reens LLC

(57) ABSTRACT

A self-standing bag containing a generally rectangular-shaped bale of compressed loose material. The self-standing bag has a generally elongated shape with a height and a base section defined by a first side and a second side. The bag is formed from a tube of impervious flexible material defining an enclosure completely enclosing the bale. The bag comprises a flat bottom end, preferably closed by an end seal. The bottom end is normal to a longitudinal axis of the tube and enables the bag to stand upright. The self-standing bag further comprises a sealed top end. A method for producing such a self-standing bag of compressed loose material is also disclosed.

16 Claims, 16 Drawing Sheets

U.S. PATENT DOCUMENTS

| | | | |
|---|---|---|---|
| 5,477,658 A | 12/1995 | Berger et al. | 53/399 |
| 5,515,666 A | 5/1996 | Berger et al. | 53/529 |
| 5,699,915 A | 12/1997 | Berger et al. | 206/597 |
| 6,904,736 B2 * | 6/2005 | Drolet | 53/441 |

OTHER PUBLICATIONS

Notification and Transmittal of International Preliminary Report on Patentability, Mar. 19, 2007, 7 pages.

* cited by examiner

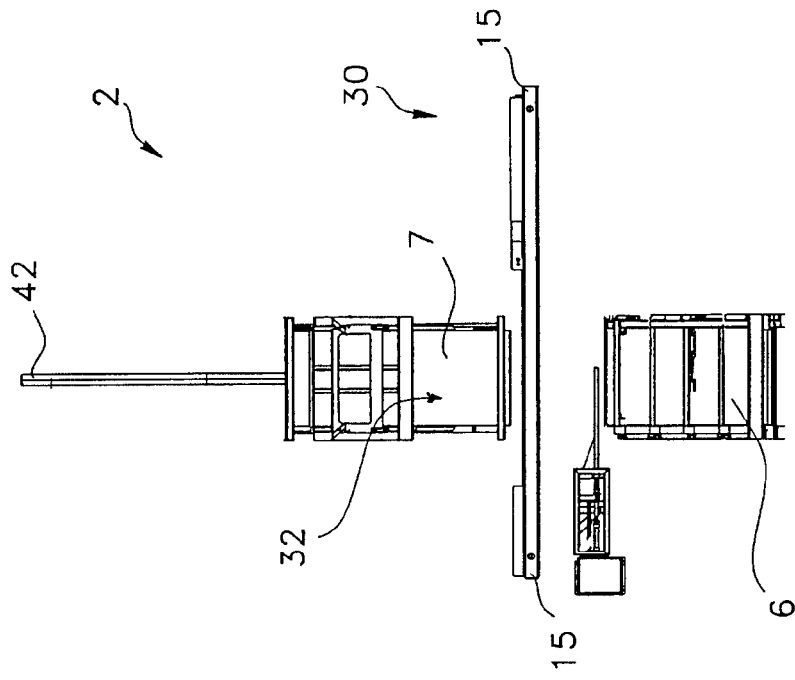
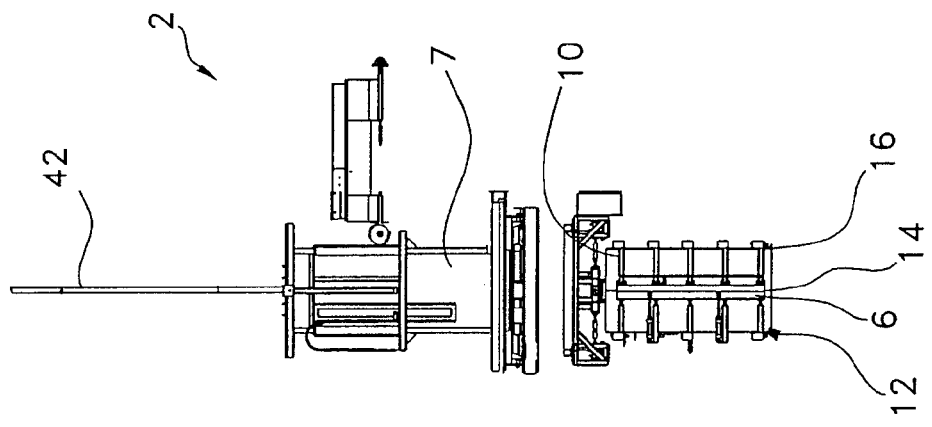
FIG. 4
FIG. 3

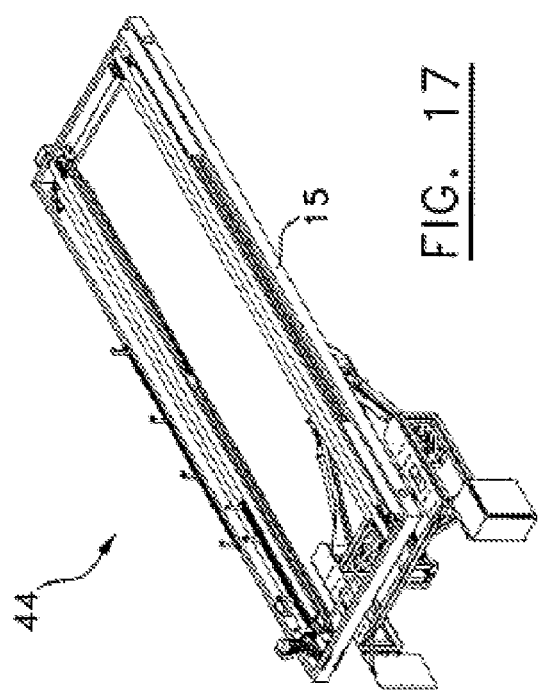
FIG. 17
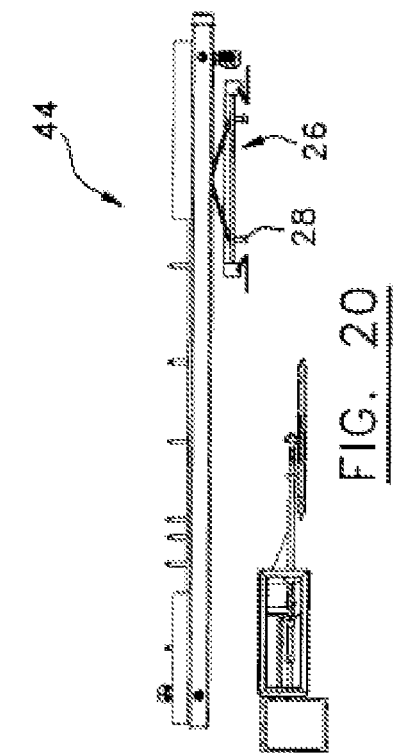
FIG. 20
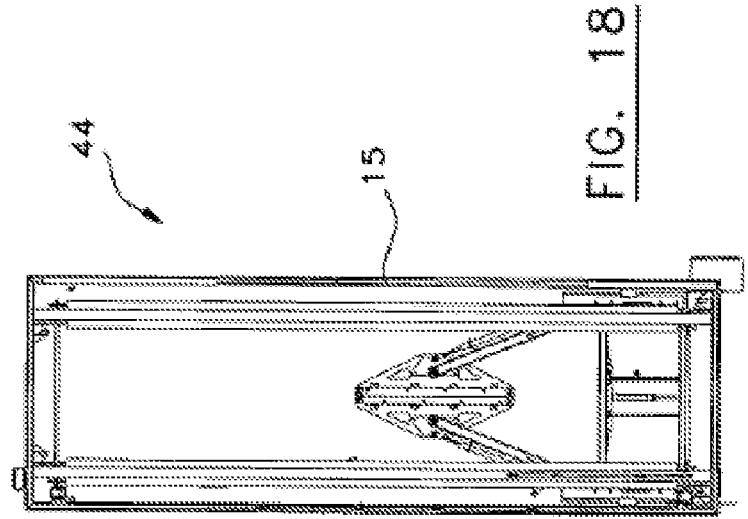
FIG. 18
FIG. 19

APPARATUS FOR PRODUCING A SELF-STANDING BAG FOR BALES OF COMPRESSED LOOSE MATERIAL AND A METHOD THEREOF

CROSS-REFERENCE TO RELATED APPLICATIONS

The present application is a continuation of pending International patent application PCT/CA2005/001691 filed on Nov. 3, 2005 which designates the United States and claims priority from Canadian patent application 2,486,631 filed on Nov. 3, 2004 and under Title 35, U. S. Code, Section 119(e), U.S. Provisional Patent Application No. 60/624,182 filed on Nov. 3, 2004, the content of which is incorporated herein by reference.

FIELD OF THE INVENTION

The invention relates generally to bags for containment of compressible loose material, such as organic fibrous material. More particularly, it relates to an apparatus for producing a self-standing bag for bales of compressed loose material. It also relates to a method for producing the self-standing bag of compressed loose material.

BACKGROUND OF THE INVENTION

While various baler designs and bags for use in the baler have been disclosed in recent years, no one can address all the problems that still exist when baling various compressible products, such as synthetic products and organic fibrous products (e.g. sphagnum peat moss, mulch, etc.).

The existing balers for producing large bales of compressible loose material (e.g. bales having a volume more than 64 cu.ft.) typically compress the product directly onto a pallet to form a bale. The pallet and the bale are then moved to another station where the bale is wrapped with a stretch film. In order to move the bale while the bale is not contained by a bag or a film, the product has to be very compact. However, this tends to damage the product properties.

Other balers stretch wrap the bale after the compression at the same station. Therefore, the product is less compressed but the final package is not perfectly tight because water can infiltrate between the plastic layers and by the bottom of the bale.

Also, in both of the previously described known balers, a pallet onto which the bale is formed is required for manipulating the bale. Moreover, stretch wrapping the bale often requires a lot more plastic film than using a bag for bagging the same volume of compressed product.

Known balers for producing small bales of compressed product such as organic fibrous material (bales up to 6 cu.ft cannot be used to produce big bales (bales more than 64 cu.ft). These balers are usually carrousel type baling apparatuses comprising four (4) distinct stations distributed around a central vertical axis. Such apparatuses also comprise four (4) compression boxes mounted on a rotational platform that rotates around the central vertical axis and that allows the compression boxes to stop at each station. At each station, one of the four (4) following steps is performed: placing a bag in a compression box; filling the bag with a predetermined quantity of compressible loose material; compressing the loose material into the bag; and sealing the bag. In use, the carousel type baling apparatuses can perform the four (4) steps simultaneously, thereby increasing the productivity. However, one drawback of these apparatuses is that the bale is ejected from the compression box by being pushed sideways onto a conveyor. Larger bales would be too heavy for this type of ejection.

Balers for producing bales of 64 cu.ft or less usually comprise only two stations mounted on a rotational platform that rotates around the central vertical axis. At the first station, the bag is filled and compressed by applying pressure along a vertical axis while at the other station, the bag is sealed, ejected and a new bag is placed. However, one drawback of these apparatuses is that the bottom of the bale is not fully supported during transition of the bale from the filling and compressing station to the sealing and ejecting station. Consequently, the bottom of the bag may round off and the bag may become unstable on a flat surface. It is indeed known in the art that compression of material in a bag inevitability creates a compression gradient along the axis of compression being applied. Because of this, material at the bottom of a compressed bag is more dense at the bottom of the bag than at the opening of the bag. Moreover, when organic fibrous material such as peat moss and mulch are compressed, a resilient effect along the compression axis appears after compression of the material and release of the applied pressure. This resilient effect leads to compressed rectangular bags which typically have bulged surfaces on the two opposite surfaces along the axis of compression with relatively flat surfaces on the four other surfaces. Depending on the resilient properties of the material being compressed, this bulging effect can appear from a few seconds to close to an hour after closure of the bag with compressed material.

Known in the art are U.S. Pat. Nos. 4,121,399 (Verville), 5,477,658 (Berger et al.), 5,515,666 (Berger et al.), 5,699,915 (Berger et al.) and Canadian patent no. 1,043,310 (Verville), which disclose various apparatuses and methods for baling compressible loose material.

SUMMARY OF THE INVENTION

An object of the present invention is to provide an improved apparatus for producing a self-standing bale.

In accordance with the present invention, there is provided an apparatus for producing a self-standing bale, comprising:
  a frame;
  a compression tube mounted to the frame and extending along a longitudinal axis, the compression tube having a top open opposite to a bottom end, the bottom end comprising a flat supporting surface closing the bottom end of the compression tube;
  a compressor positioned in alignment over the compression tube to compress the loose material in the compression tube against the supporting surface, thereby obtaining the material in a compressed form;
  setting means for setting a plastic bag having an unsealed top end and a sealed bottom end over the top open end of the compression tube and opening the unsealed top end of the bag;
  spreading means for spreading out the plastic bag within the compression tube;
  feeding means for feeding the loose material into the plastic bag; and
  sealing means adjacent to the top open end of the compression tube for sealing the unsealed top end of the plastic bag, wherein the setting means, the spreading means and the sealing means are positioned above the compression tube and are laterally movable with respect to said longitudinal axis between a first position in alignment with the compression tube and a retracted position away for the compression tube.

Also provided, there is a method for producing a self-standing bale as described above, comprising the steps of:
  a) providing an upright compression tube having an open top end and a bottom end, the bottom end comprising a flat supporting surface closing the bottom end of the compression tube;
  b) providing a bag having an unsealed top end and a sealed bottom end;
  c) setting the bag over the open top end of the compression tube using a laterally retractable bag holder carriage device;
  d) opening the unsealed top end of the bag with the retractable bag holder carriage device;
  e) spreading out the bag against the compression tube with a laterally retractable spreading carriage device;
  f) feeding a certain volume of compressible loose material into the bag with a feeding tube, the volume of compressible loose material being greater than a nominal filling volume of the bag;
  g) pushing the compressible loose material downwardly into the bag against the supporting surface with a compressor to obtain a compressed material at a compressed volume equal or less than the nominal filling volume of the bag; and
  h) sealing the unsealed top portion of the bag filled with the compressed material with a sealing device, thereby closing the top end portion of a formed bale of compressed material.

Another object of the present invention is to provide a bag that can contain bales of compressed loose material having a volume of more than 64 cu.ft, preferably of 128 cu. ft.

Still, another object of the present invention is to provide a vertically stable bales of compressed loose material having generally flat walls, without the use of a pallet. Advantageously, the self-standing-bag according to the invention can be shipped, handled or transported with or without the use of pallets or without any load security device, such as stretch wrap or straps.

In accordance with the present invention, there is provided a self-standing bale of compressed loose material, comprising
  a body of vertically compressed resilient fibrous material contained in a plastic bag formed from a tube of impervious flexible plastic material defining an enclosure completely enclosing the body;
  the bale having:
    a height (L) and a base section defined by a first side (s1) and a second side (s2), said height (L) being at least 1.5 times greater than the greatest dimension between said first side (s1) and second side (s2) of the base section;
    a volume of more than 64 cubic feet,
    a flat bottom end normal to a longitudinal axis of the bale, said flat bottom end allowing the bale to stand upright;
    four flat sidewalls; and
    a sealed top end.

The self-standing bale according to the present invention offers several advantages. It can have dimensions that match the size of existing pallets or can be configured for a client's specific needs. The bag can also be sized to match the size of several standard smaller bags stacked on existing standard pallets (generally 8 ft high, the maximum height allowed in trailers). Once filled, the base of the bag is flat which ensures vertical stability for the bale over long periods of time. In the upright position, the bag is sealed at both ends, which protects the bag against the penetration of water, insects, weeds or other external agents.

The use of the bale is also advantageous for the environment since it results in up to 30% savings in the use of wrapping material, when compared to two standard 55 ft³ bags. Also, the use of a pallet to support the bale is no longer required.

The bag according to the present invention offers a better volume/quantity of material ratio since one large bag contains more material than several smaller stacked bags.

The manipulation of the material leftover after the bag is opened is also facilitated since only an empty bag is produced rather than several sheets of ripped wrapping material. The bags according to the present invention can also have pre-printed indications on a surface thereof to facilitate identification of the bale.

Furthermore, the appearance or the integrity of the filled bag according to the present invention is not affected by the characteristics of the compressible loose material it contains (e.g. humidity, density, shape of fibers of moss, or other materials).

BRIEF DESCRIPTION OF THE DRAWINGS

These and other objects and advantages of the invention will become apparent upon reading the detailed description and upon referring to the drawings in which:

FIG. 3 shows a schematic front view of the apparatus shown in FIG. 2 with the frame removed.

FIG. 4 shows a schematic side view of the apparatus shown in FIG. 2 with the frame removed.

FIG. 17 is a top perspective view of the sealing device set adjacent to the compression tube shown in FIG. 2.

FIG. 18 is a top view of the sealing device shown in FIG. 17.

FIG. 19 is a front view of the sealing device shown in FIG. 17.

FIG. 20 is a side view of the sealing device shown in FIG. 17.

DETAILED DESCRIPTION OF THE INVENTION

Figure 1:
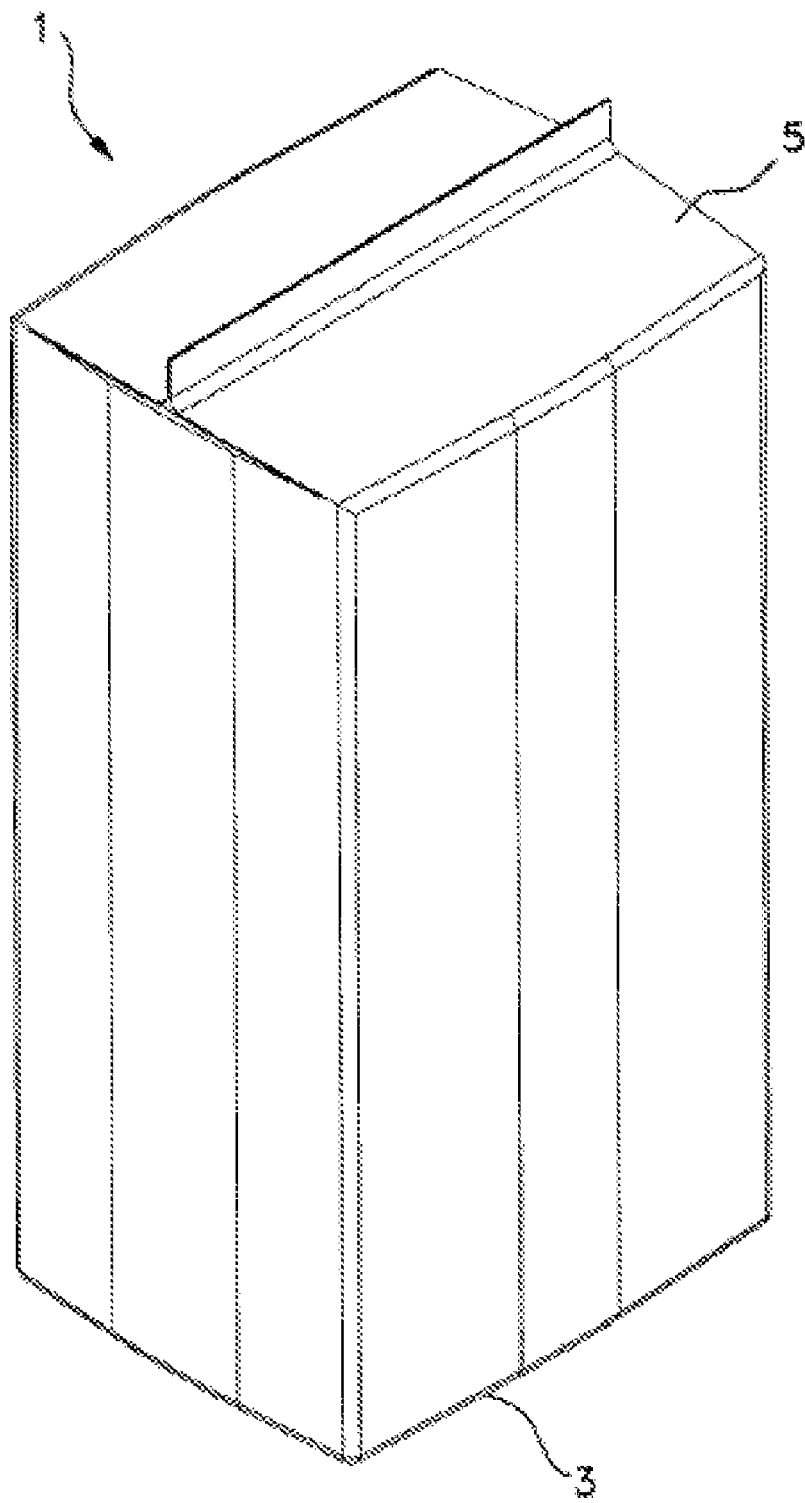
FIG. 1 is a perspective view of collection of filled self-standing bags according to a preferred embodiment of the present invention.

In the following description, similar features in the drawings have been given similar reference numerals and in order to lighten the figures, some elements are not referred to in some figures if they were already identified in a precedent figure.

Referring to FIG. 1, a self-standing bag 1 containing a generally rectangular-shaped bale of compressed loose material in accordance with an embodiment of the present invention is shown. The self-standing bag 1 has a generally elongated shape with a height (L) and a base section defined by a first side (s1) and a second side (s2). The bag 1 is formed from a tube of impervious flexible material defining an enclosure completely enclosing the bale. It comprises a flat bottom end 3, preferably closed by an end seal. The bottom end 3 is normal to a longitudinal axis of the tube and enables the bag to stand upright. The self-standing bag 1 further comprises a sealed top end 5.

Preferably, the enclosure has a volume of more than 90 cubic feet.

Preferably, s1 ranges from 48" to 54", and s2 ranges from 40" to 48". More preferably, the dimensions of the flat bottom end 3 are 40" by 48" and the bag 1 has a height of 90".

Preferably, the impervious material is selected from the group consisting of heat-sealable thermo-plastic, jute and polywoven. Preferably, the impervious material is polyethylene having a thickness between 0.005" and 0.010–.

Figure 2:
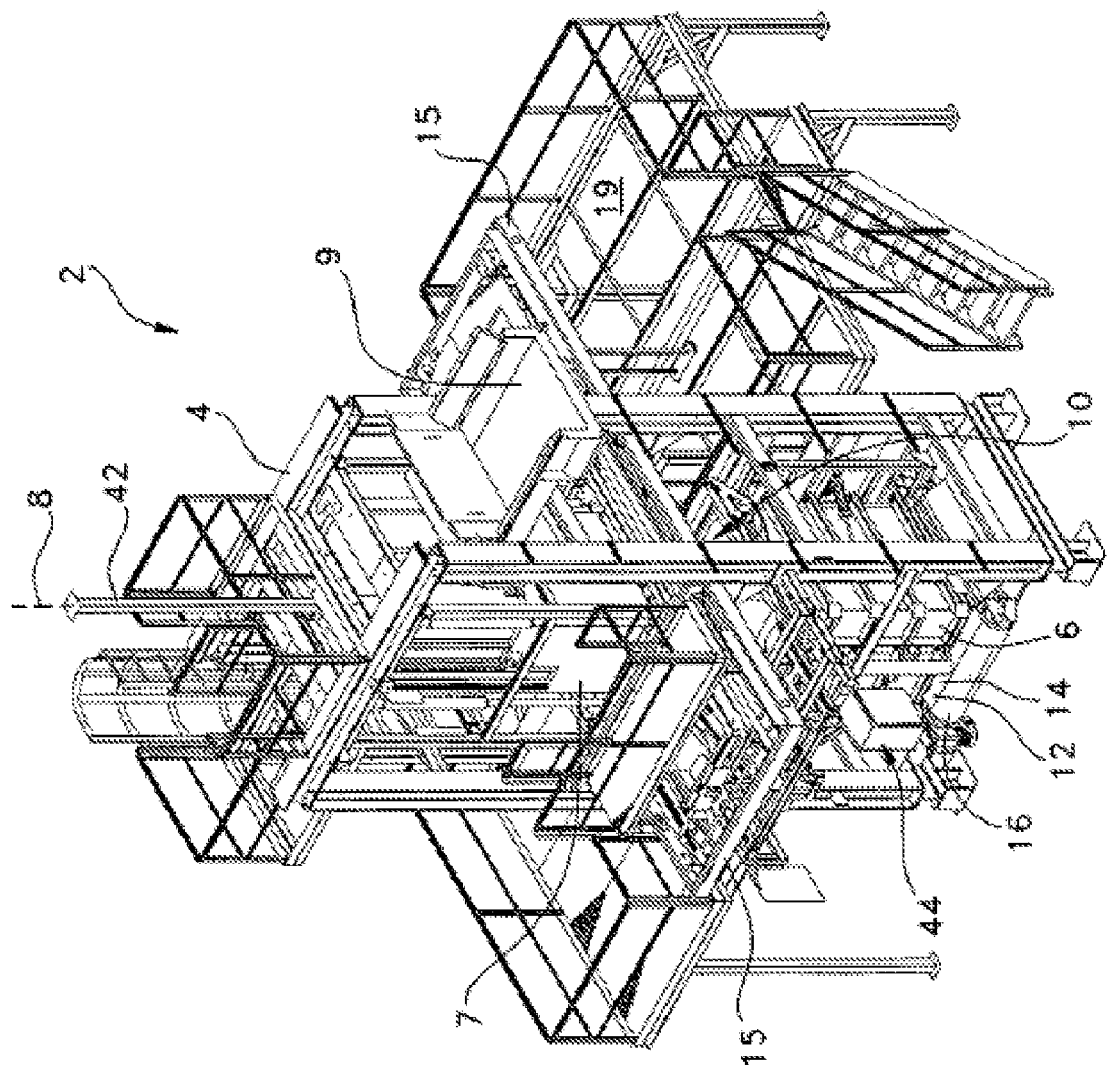
FIG. 2 is a schematic perspective view of an apparatus for producing self-standing bags containing the bales of compressed loose material according to a preferred embodiment of the present invention, comprising a compression tube.
Figure 16:
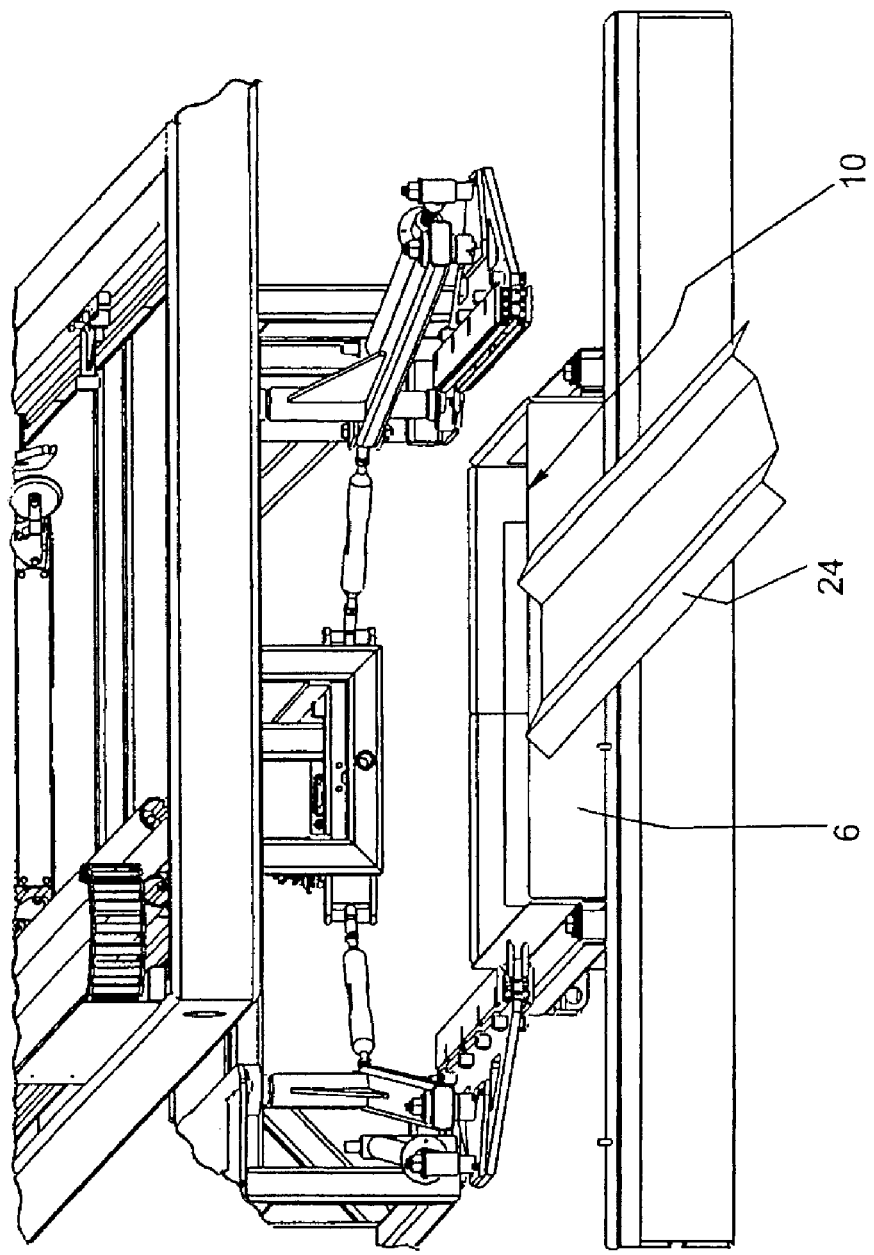
FIG. 16 is a perspective view of the compression tube shown in FIG. 2 seen from the top, with the frame removed.
Figure 22:
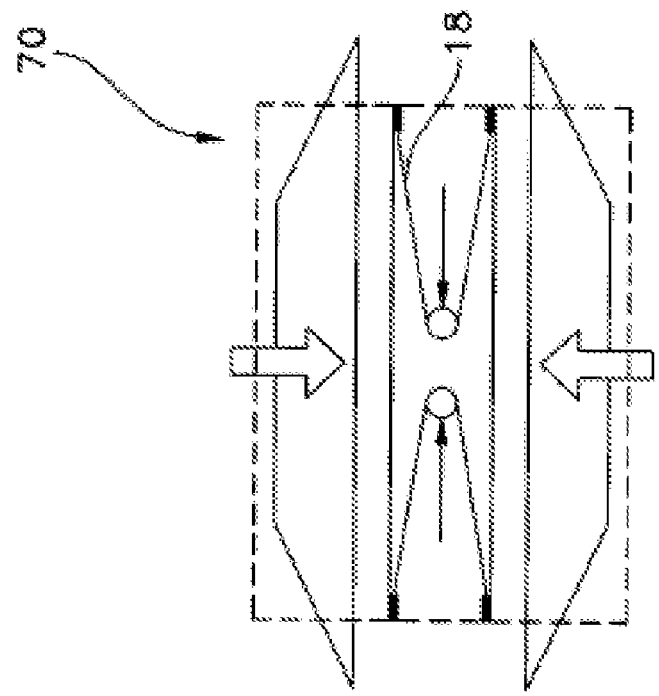
FIGS. 21 and 22 are schematic top views of a bag being folded prior to the sealing operation.
Figure 21:
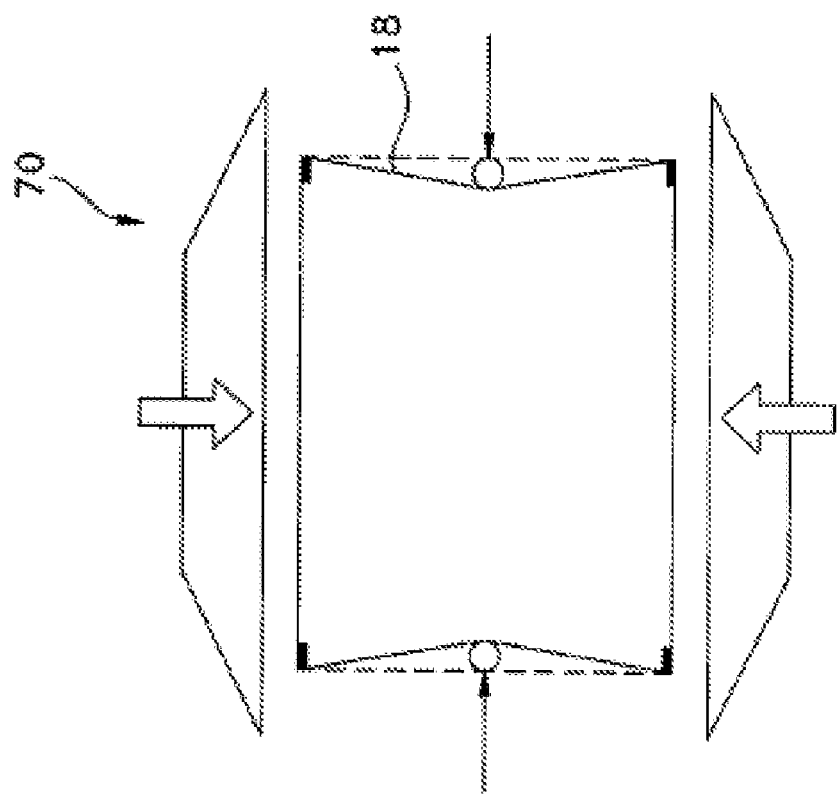
Figure 23A:
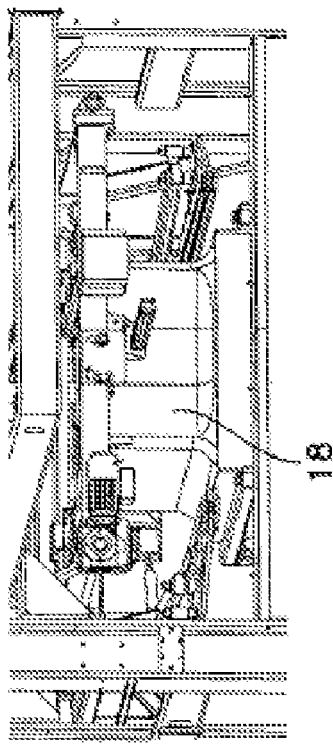
FIGS. 23a, 23b, 23c and 23d are perspective views of the bag being folded by the bag holder as shown in FIGS. 21 and 22.
Figure 23B:
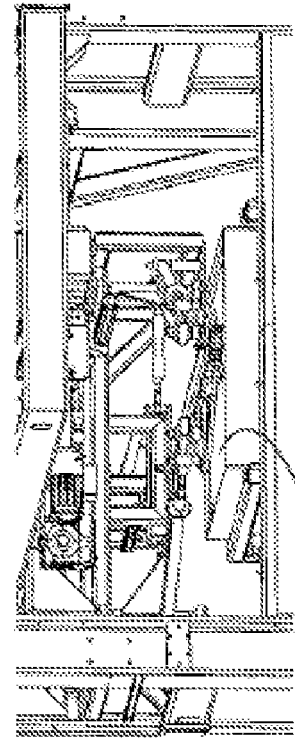
Figure 23C:
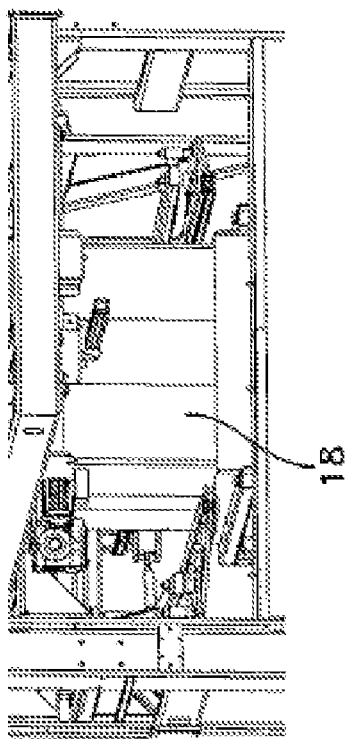
Figure 23D:
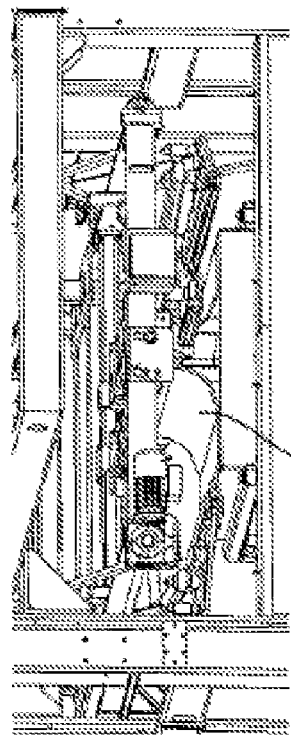

Referring to FIGS. 2 to 4, a baling apparatus 2 is suitable for producing the self standing bags containing bales of compressible loose material according to the present invention. The baling apparatus 2 has a frame 4 to which is mounted a compression tube 6 and a filling tube 7. The compression tube 6, which extends along a longitudinal axis 8, has an open top end 10 (better shown in FIG. 16) opposite to a closed bottom end 12. The bottom end 12 is closed by a supporting surface 14. The supporting surface 14 is preferably embodied by an unloading conveyor 16. A feeding conveyor 9 is preferably used to convey the compressible loose material to the filling tube 7.

Figure 5:
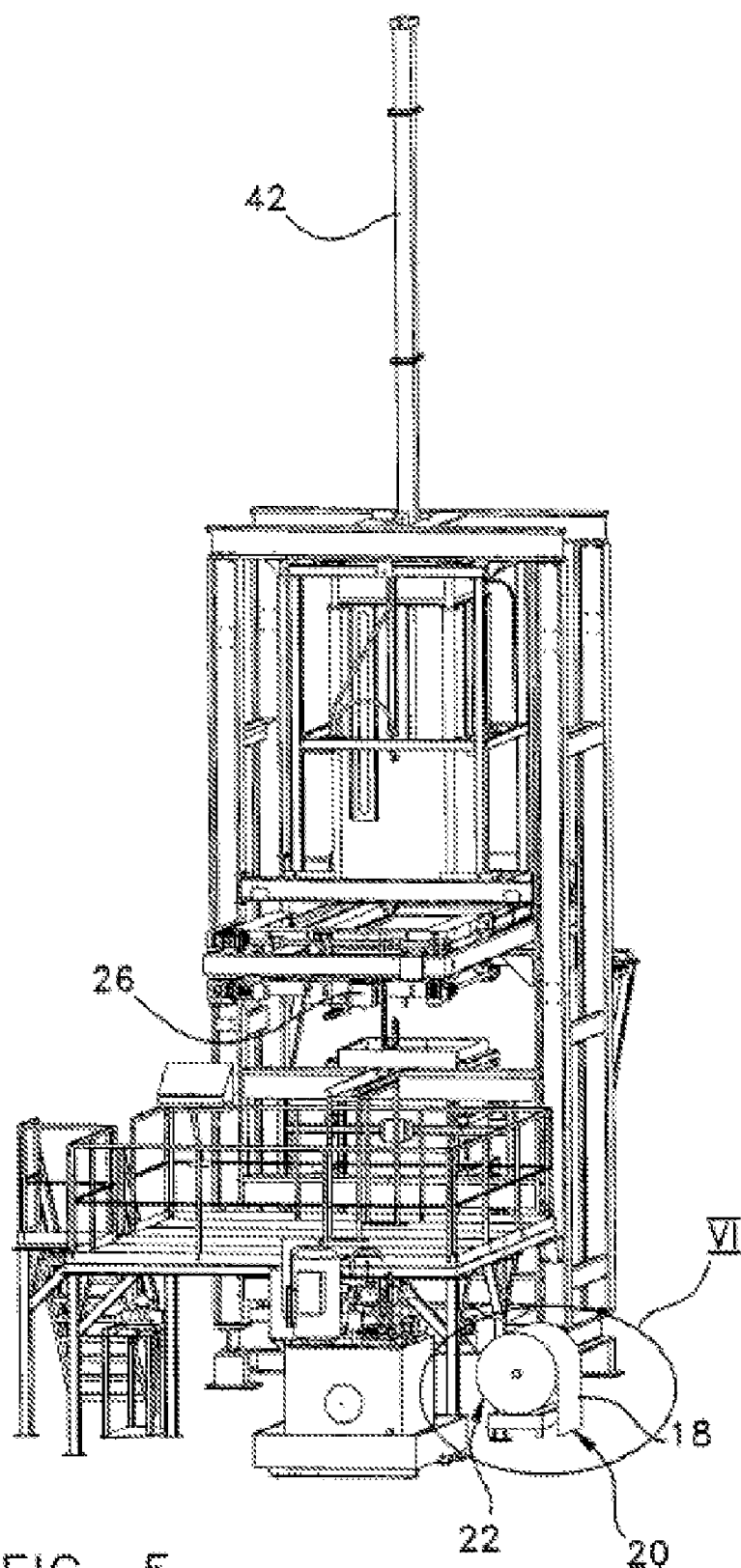
FIG. 5 is a perspective view of the apparatus shown in FIGS. 2 to 4, where the bag holder of the apparatus is shown, the holder extending over the area where the top end of a bag to be filled can be fixed by an operator to the bag holder.
Figure 6:
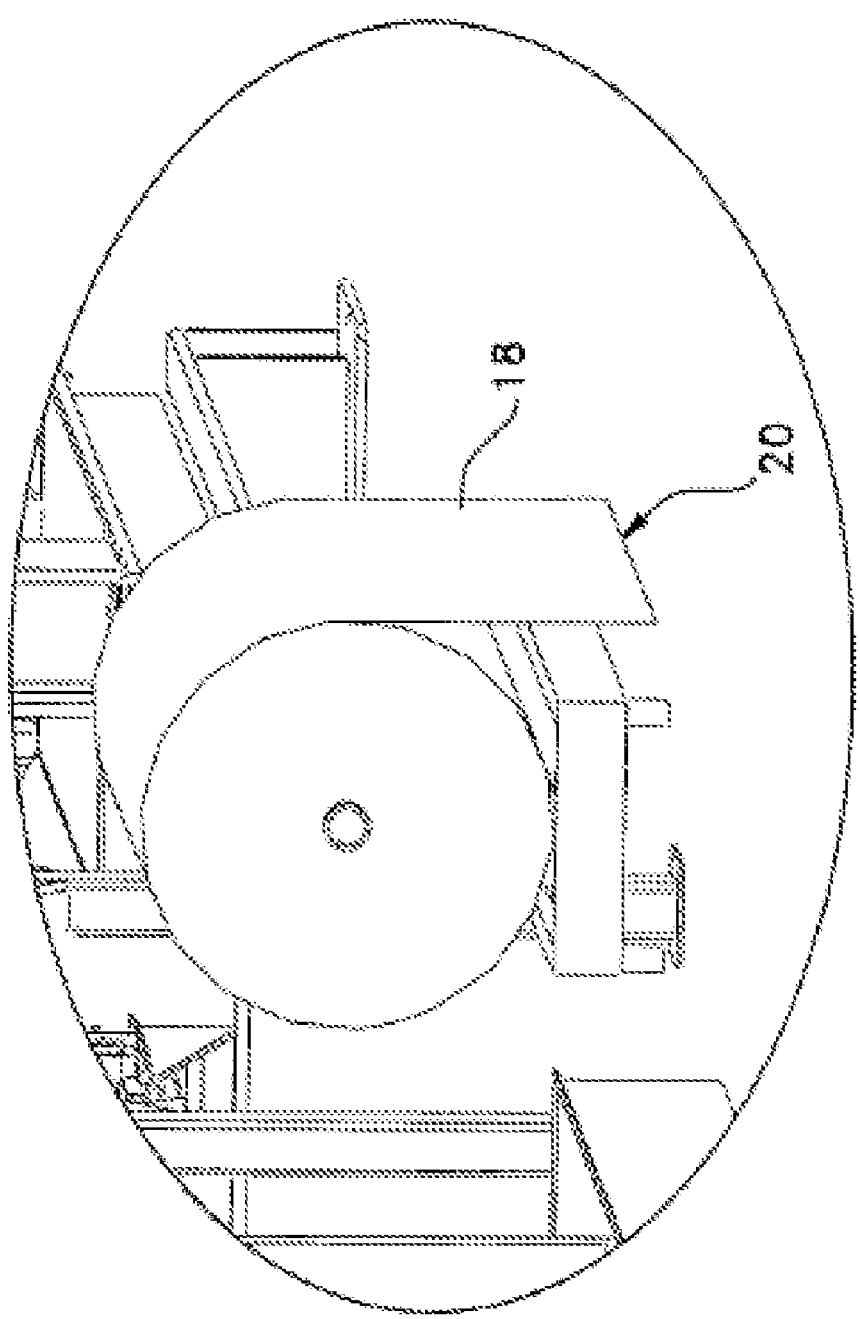
FIG. 6 is a detailed view of the apparatus shown in FIG. 5, showing the roller of pre-cut poly tubing set adjacent to the apparatus and used to feed the apparatus.

Turning now to FIGS. 5 and 6, a unfilled bag 18 preferably made of plastic, is used to contain the compressible loose material. The unfilled bag 18 has an unsealed top end 20 and a sealed bottom end. The unfilled bag 18 is filled of compressible loose material through its unsealed top end 20. The bag 18 may be dispensed by a roller of pre-cut poly tubing 22 comprising a plurality of bags 18. Each bag 18 may be torn apart from the roller 22 by an operator or by a suitable device. Although a plastic bag 18 is preferably used, any other suitable bag can be used for that purpose.

Figure 7:
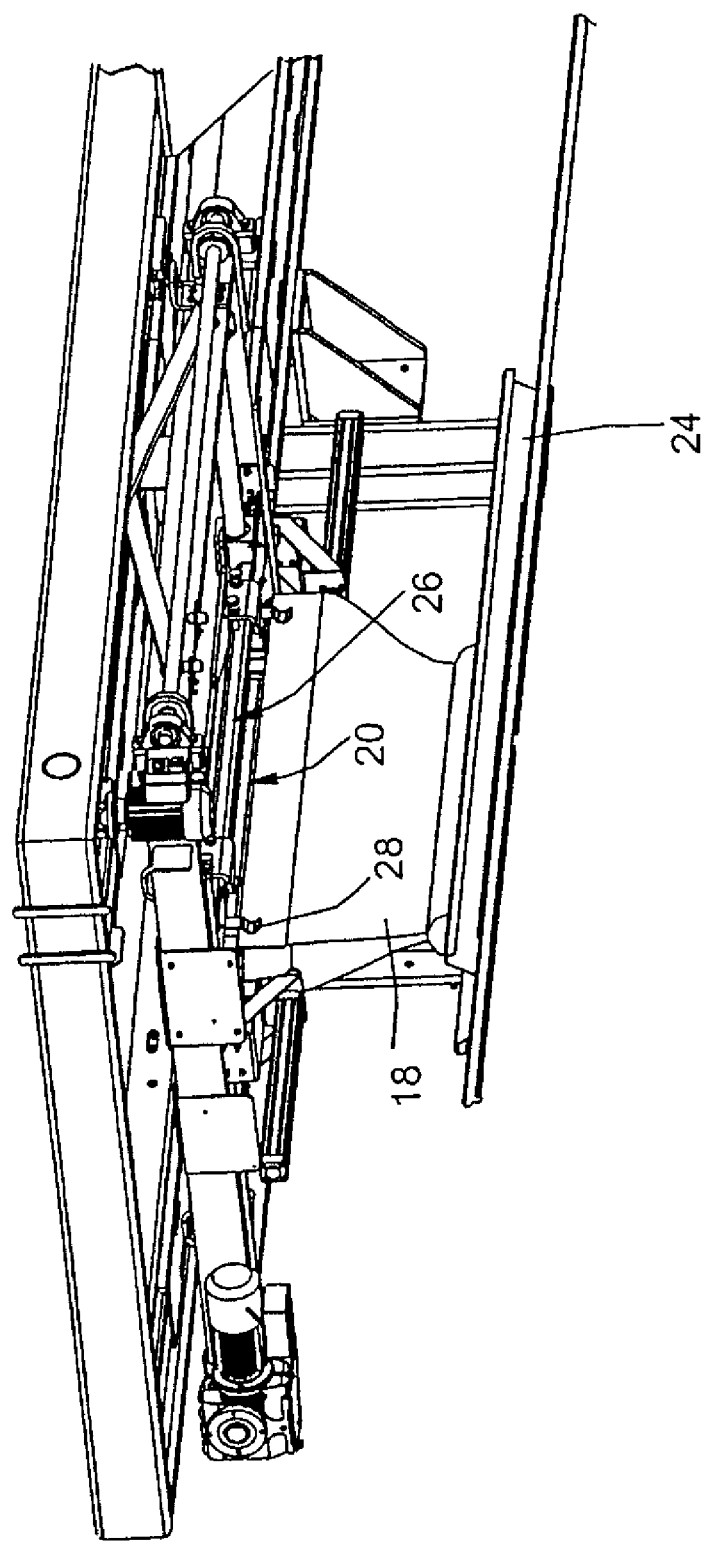
FIG. 7 is perspective view of the bag to be filled fixed on the bag holder shown in FIG. 5, the bottom end of the bag being rolled up and supported by a tray, with the frame removed.
Figure 8:
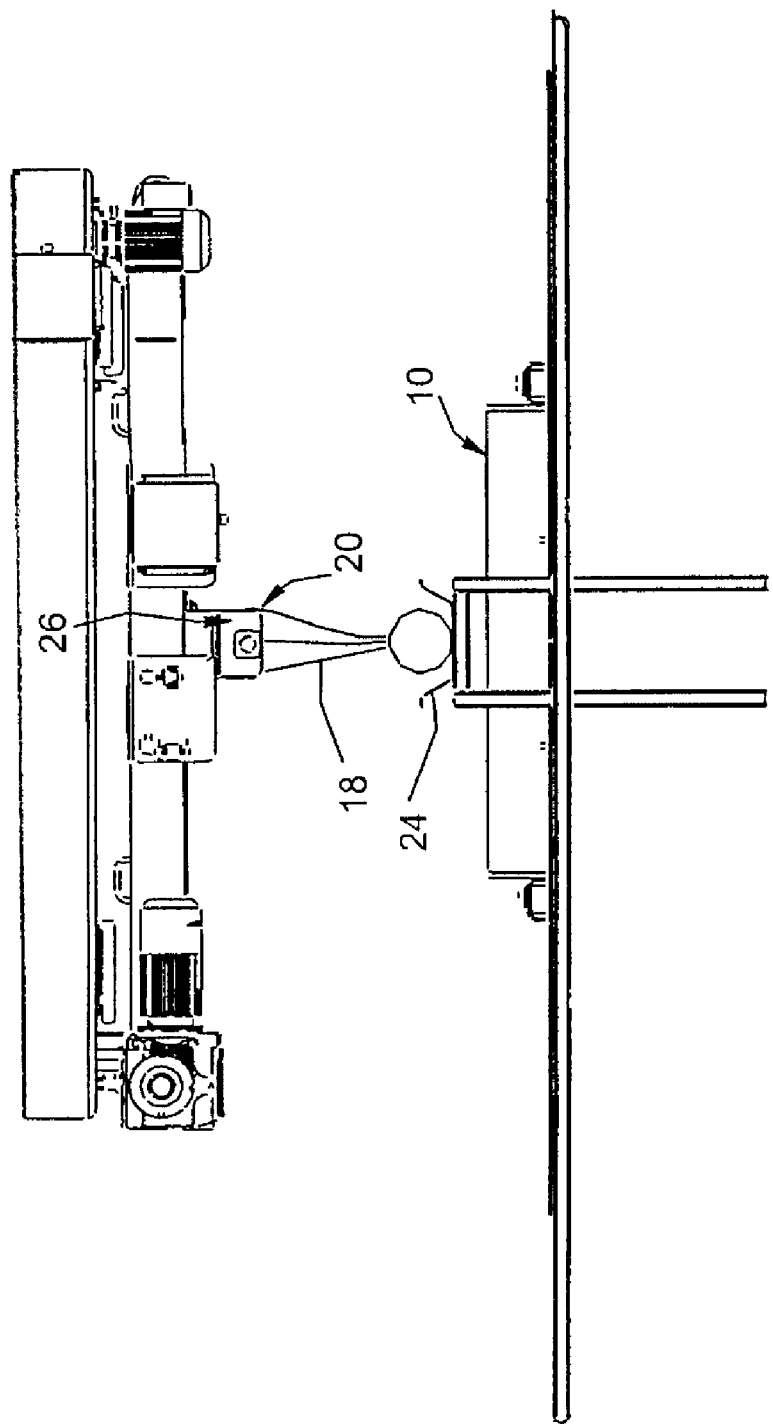
FIG. 8 is a side view of the bag shown in FIG. 7 with the frame removed.
Figure 9:
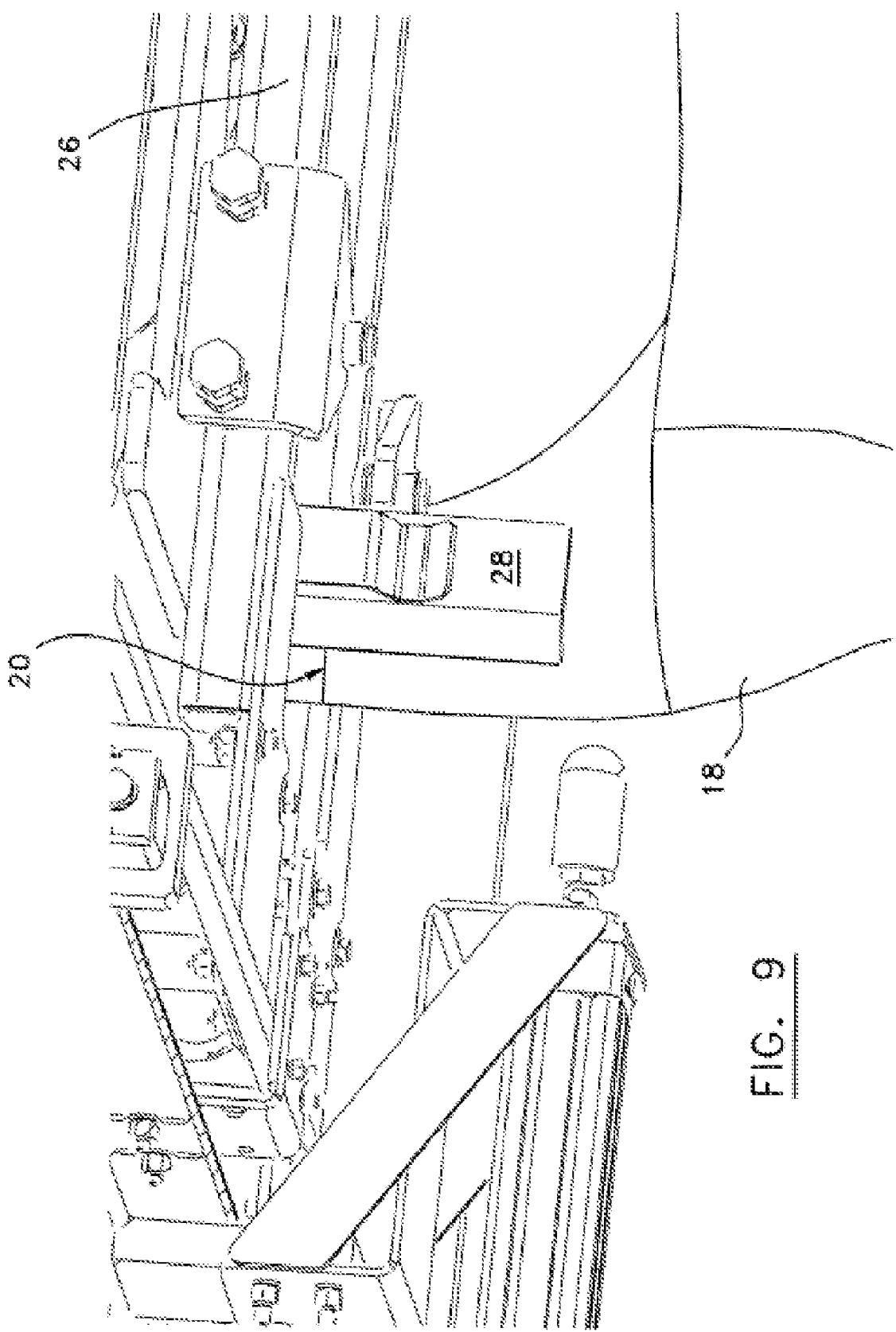
FIG. 9 is a detailed view of one of the clips of the bag holder shown in FIGS. 7 and 8, the clips being used to hold the corners of the unsealed top portion of the bag.
Figure 10:
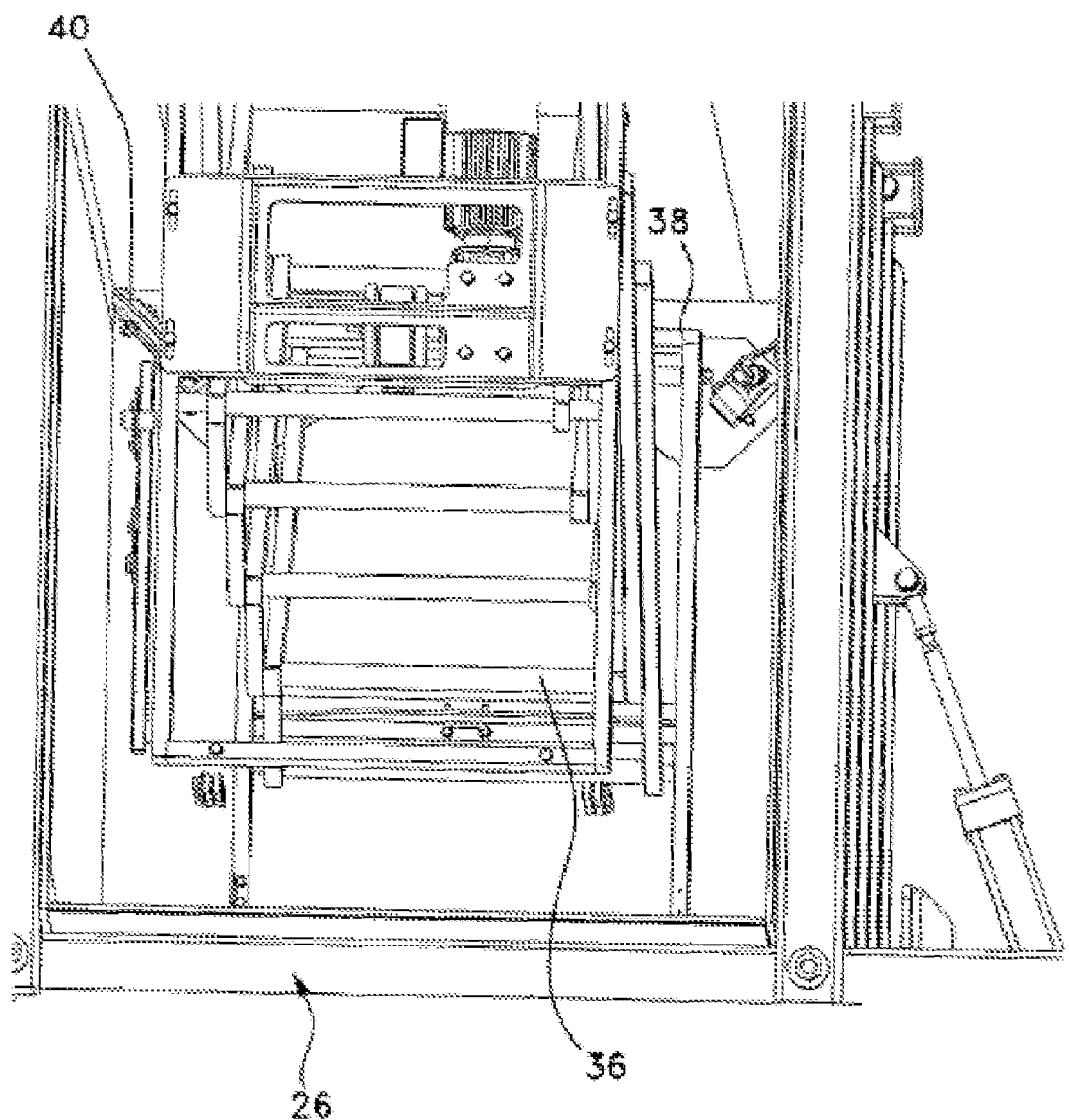
FIG. 10 is a perspective view from the top of the compression tube of the apparatus of FIG. 5, showing a bag being held open in the compression tube, by means of a spreading device extending into the bag to spread out the bag within the compression tube.
Figure 11:
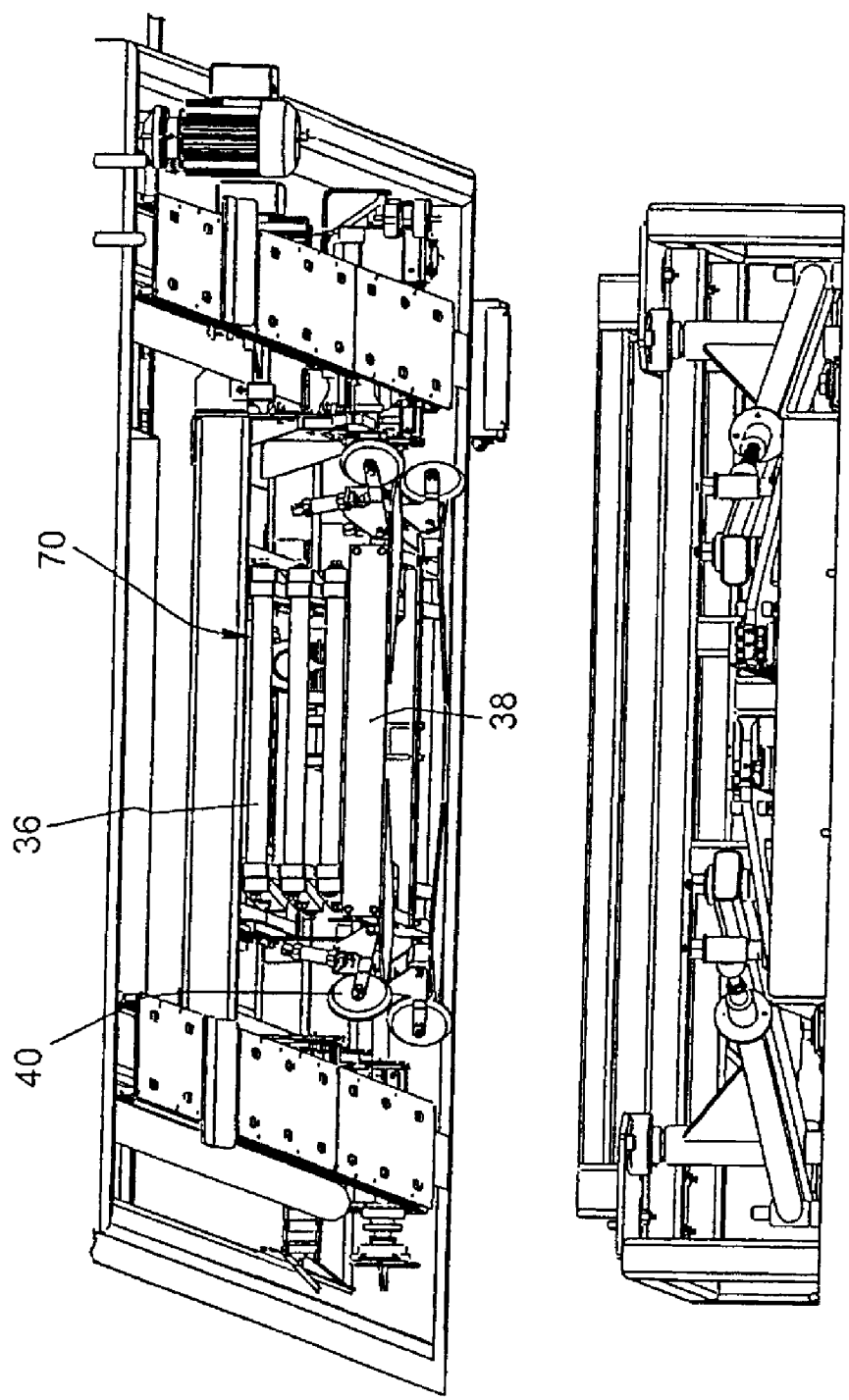
FIG. 11 is a perspective view, from the bottom, of the spreading device shown in FIG. 10, in a retracted position, with the frame removed.

Referring to FIGS. 2, 7, 8 and 9, a bag holder 26 is slideably mounted on a frame 15 extending horizontally above the compression tube 6. The bag holder 26 can be moved along the frame 15 between a first position 30 (as shown in FIGS. 7 and 8) where the bag holder 26 extends above a working area 19 and a second position 32 (as shown in FIG. 4) where the bag holder 26 extends over the compression tube 6. When a new bag from the roller 22 is ready to be installed, the bag holder 26 is set to the first position 30, thereby allowing an operator to fix the unsealed top end 20 of the bag 18 to the bag holder 26. Preferably, clips 28 are used to hold the four (4) corners of the unsealed top end 20 of the bag 18. The sealed bottom portion of the bag 18 may be rolled up and supported by a tray 24 extending beside the compression tube 6 at the level of the open top portion 10 of the compression tube 6. The tray 24 has an elongated shape and a smooth surface to enable the bag 18 to easily slide on it. Once the unsealed top end 20 of the bag 18 is fixed to the bag holder 26, the bag holder 26 is slid to the second position 32, thereby carrying the bag 18 over the compression tube 6, and allowing the bottom end of the bag 18 to unroll within the compression tube 6.

Figure 15:
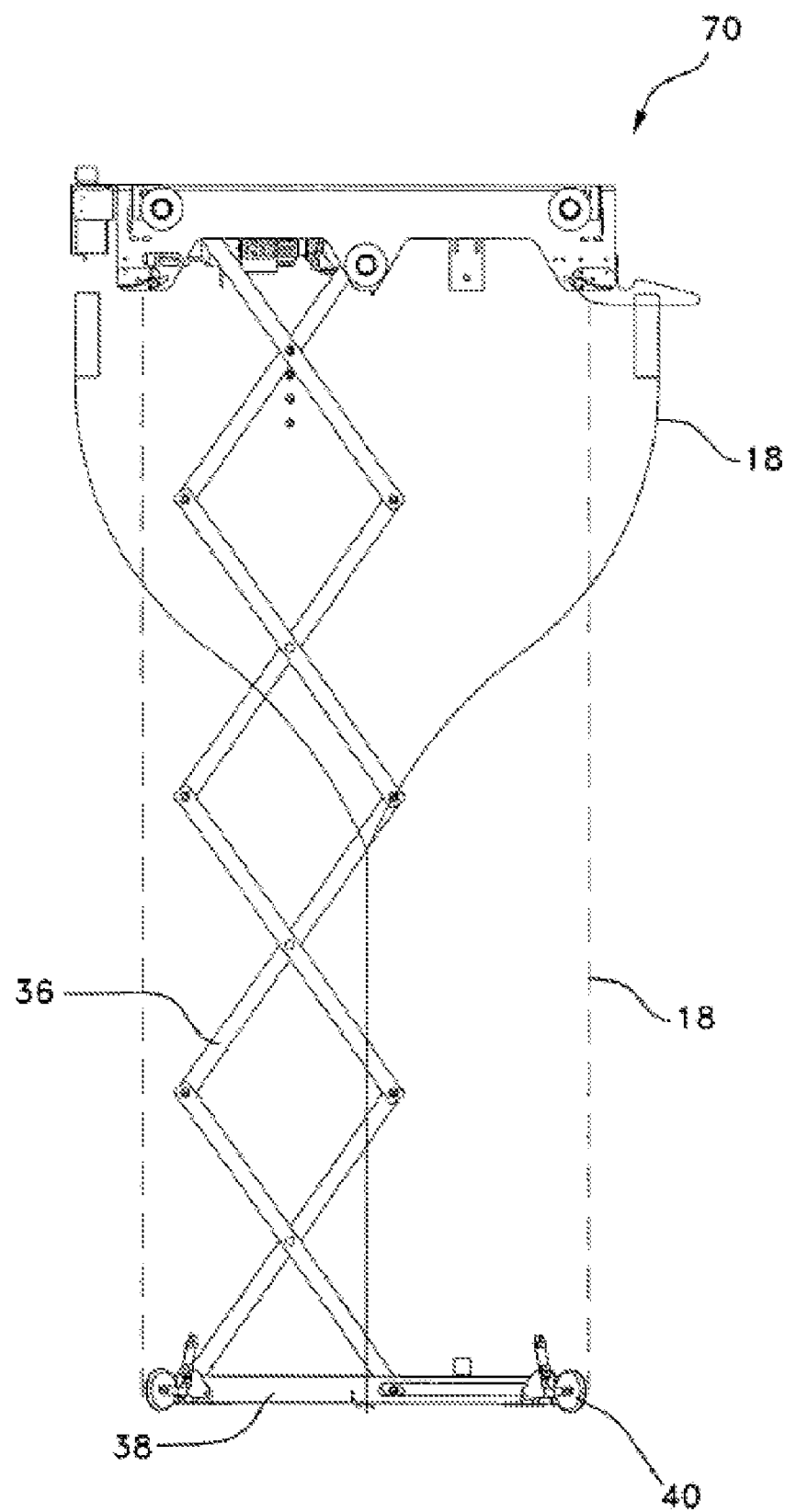
FIG. 15 is a side view of the spreading device shown in FIG. 12, in an extended position, the dashed lines representing the bag spread out within the compression tube as shown in FIG. 10 and the plain lines representing the bag partially opened within the compression tube before the extension of the spreading device.

Then, as shown in FIG. 15, the bag holder 26 opens the unsealed top end 20 of the bag 18. At this stage, and depending on the bag's 18 material, the bag 18 may not spread out completely. For example, if the bag 18 is made of plastic, it may not spread out because of electrostatic charges. Therefore, the bag 18 may take a Y shape as illustrated by the plain line representing the bag 18 in FIG. 15.

Figure 12:
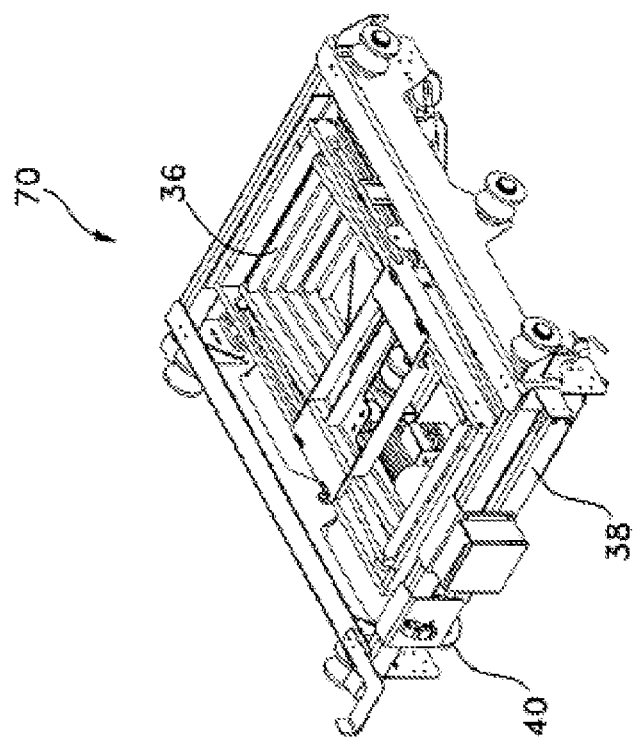
FIG. 12 is a top perspective view of the spreading device shown in FIG. 11.
Figure 13:
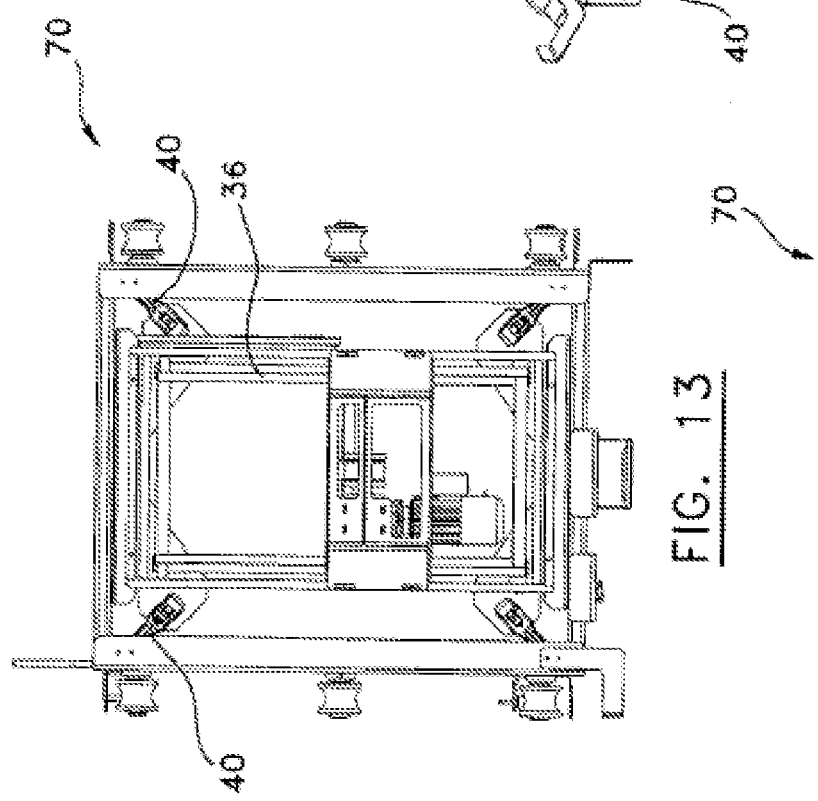
FIG. 13 is a top view of the spreading device shown in FIG. 12.
Figure 14:
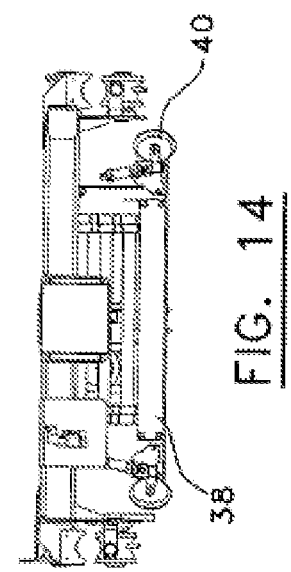
FIG. 14 is a front view of the spreading device shown in FIG. 12.

In order to overcome that drawback, and as shown in FIGS. 10 to 15, the apparatus comprises a spreading device 70, which preferably consists of a scissor mechanism 36 having a free end provided with a rectangular frame 38. The scissor mechanism 36 may take a retracted position, as shown in FIGS. 12 to 14, and an extended position, as shown in FIG. 15. The bag 18 is spread out while the scissor mechanism 36 is brought from its retracted position to its extended position. The scissor mechanism 36 also takes a third position where it is completely removed from above the compression tube 6. This third position is necessary to allow the filling tube 7 to be introduced in the unsealed top end 20 of the bag 18 and also for a compressor 42 to reach the material inside the bag 18.

The rectangular frame 38 preferably has wheels 40 at each corner to avoid any damage to the bag 18 during the extension of the rectangular frame 38 into the bag 18. These wheels 40 also push the corners of the bag 18 toward the corners of the compression tube 6. The wheels 40 may be in a retracted position during retraction of the scissor mechanism 36 from the compression tube 6. Once the bag 18 is spread out, the rectangular frame 38 is removed from the bag 18 and moved to its third position. The filling tube 7 is then introduced into the unsealed top end 20 of the bag 18 to start filling up the same with compressible loose material.

A compressor 42, also mounted to the frame along the longitudinal axis 8 (better shown in FIG. 2), is used for compressing the material in within the bag 18, against the unloading conveyor 16.

As shown in FIGS. 17 to 20, the baling apparatus 2 also has a sealing device 44 adjacent to the top open end 10 of the compressible tube 6 for sealing the unsealed top end 20 of the bag 18 after the filling step and the compression step.

Referring now to FIGS. 21, 22, 23a to 23d, the bag holder 26 folds the unsealed top end 20 of the bag 18 prior to the sealing operation. Once the side walls of the bag 18 are in contact with each other, the sealing device 44 is activated, thereby obtaining a transverse seam sealing the top open portion 20 of the bag 18.

The compression tube 6 may open along its length to discharge the just formed bale using the unloading conveyor 16 (shown in FIG. 2).

Preferably, a bale according to the present invention may have a large size, (e.g. more than 64 cubic feet, preferably 128 cubic feet) be vertically stable and have generally flat walls.

Preferably, bags according to the present invention can have the following specifications which can be modified to adapt to different users' requirements:

Type 1 Bag:
Thickness: 0.0065" or 0.007"
Dimensions of bale (length×width×height.): 52.5"×44"×90"
Type of plastic: Polyethylene
Type 2 Bag:
Thickness: 0.0065"
Dimensions of bale (length×width×height.)—1000 mm×1200 mm×2150 mm
Type of plastic: Polyethylene In accordance with the present invention, there is also provided a method for producing a self-standing bag of compressed loose material, comprising the steps of:
  providing an elongated tube of impervious flexible material with an open top and a closed bottom end,
  inserting and maintaining the tube in an upright rectangular rigid sleeve;
  filling the top end of the tube with a compressible loose material;
  compressing the compressible loose material within the tube; and
  sealing the top end of the tube.

Although a preferred embodiment of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. An apparatus for producing a self-standing bale, comprising:
  a frame;
  a compression tube mounted to the frame and extending along a longitudinal axis, the compression tube having a top open end opposite to a bottom end, the bottom end comprising a flat supporting surface closing the bottom end of the compression tube;
  a compressor positioned in alignment over the compression tube to compress the loose material in the compression tube against the supporting surface, thereby obtaining the material in a compressed form;
  setting means for setting a plastic bag having an unsealed top end and a sealed bottom end over the top open end of the compression tube and opening the unsealed top end of the bag;
  spreading means for spreading out the plastic bag within the compression tube;
  feeding means for feeding the loose material into the plastic bag; and
  sealing means adjacent to the top open end of the compression tube for sealing the unsealed top end of the plastic bag,
  wherein the setting means, the spreading means and the sealing means are positioned above the compression tube and are laterally movable with respect to said longitudinal axis between a first position in alignment with the compression tube and a retracted position away for the compression tube.

2. The apparatus according to claim 1, wherein the setting means comprises a bag holder carriage device which holds the bag and places the bag over the compression tube.

3. The apparatus according to claim 2, wherein the spreading means comprises a spreading carriage device which is retractably positioned over the bag holder carriage device, said spreading carriage device spreading the bag against the compression tube.

4. The apparatus according to claim 3, wherein the spreading carriage device comprises a hollow frame actuated by a scissor deployment assembly for spreading the bag against the compression tube.

5. The apparatus according to claim 4, wherein the hollow frame comprises retractable wheels at four corners thereof.

6. The apparatus according to claim 2, wherein the bag holder carriage device comprises a support structure mechanically supporting four corners of the top opening of the bag.

7. The apparatus according to claim 1, further comprising a folding device for folding the top end of the bag.

8. The apparatus according to claim 1, wherein the sealing means is a heat sealing device.

9. The apparatus according to claim 1, further comprising conveyor means for removal of the filled bag from the apparatus.

10. The apparatus according to claim 1, wherein the feeding means comprises a mobile feeding tube disposed in alignment over the compression tube and a feeding conveyor positioned to feed the feeding tube.

11. A method for producing a self-standing bale, comprising the steps of:
  a) providing an upright compression tube having an open top end and a bottom end, the bottom end comprising a flat supporting surface closing the bottom end of the compression tube;
  b) providing a bag having an unsealed top end and a sealed bottom end;
  c) setting the bag over the open top end of the compression tube using a laterally retractable bag holder carriage device;
  d) opening the unsealed top end of the bag with the retractable bag holder carriage device;
  e) spreading out the bag against the compression tube with a laterally retractable spreading carriage device;
  f) feeding a certain volume of compressible loose material into the bag with a feeding tube, the volume of compressible loose material being greater than a nominal filling volume of the bag;
  g) pushing the compressible loose material downwardly into the bag against the supporting surface with a compressor to obtain a compressed material at a compressed volume equal or less than the nominal filling volume of the bag; and
  h) sealing the unsealed top portion of the bag filled with the compressed material with a sealing device, thereby closing the top end portion of a formed bale of compressed material.

12. The method according to claim 11, further comprising the step between step g) and step h) of:
   folding the top of the bag into a seal-ready fold through displacement along two simultaneous axes of four corners of the top of the bag held by four corresponding clips.

13. The method according to claim 11, further comprising the step of:
   conveying the filled bag away from the apparatus.

14. The method according to claim 11, wherein the spreading carriage device comprises a hollow frame actuated by scissor deployment assembly for spreading the bag against the compression tube.

15. The method according to claim 14, wherein the spreading carriage device comprises retractable wheels at four corners thereof.

16. The method according to claim 11, wherein, in step d), the bag holder carriage device opens four corners of the top end of the bag and, in step f), the feeding tube is partially inserted into the bag.

* * * * *